United States Patent
Amidon et al.

(10) Patent No.: US 8,726,344 B1
(45) Date of Patent: May 13, 2014

(54) METHODS, SYSTEMS, AND PRODUCTS FOR MEASURING TRUST SCORES OF DEVICES

(75) Inventors: Christopher M. Amidon, Apex, NC (US); Richard J. Walsh, Raleigh, NC (US); Alfredo C. Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 2740 days.

(21) Appl. No.: 11/290,897

(22) Filed: Nov. 30, 2005

(51) Int. Cl.
*G06F 7/02* (2006.01)

(52) U.S. Cl.
USPC ............. 726/2; 726/1; 726/3; 726/4; 713/168

(58) Field of Classification Search
USPC .............................. 713/150, 168; 726/1–4, 10
See application file for complete search history.

(56) References Cited

U.S. PATENT DOCUMENTS

| | | | |
|---|---|---|---|
| 7,236,455 B1 * | 6/2007 | Proudler et al. | 370/230 |
| 8,539,603 B2 * | 9/2013 | Hauser | 726/27 |
| 2003/0055898 A1 | 3/2003 | Yeager | |
| 2003/0158960 A1 | 8/2003 | Engberg | |
| 2003/0225893 A1 | 12/2003 | Roese | |
| 2003/0235309 A1 * | 12/2003 | Struik et al. | 380/278 |
| 2004/0162830 A1 | 8/2004 | Shirwadkar | |
| 2005/0033991 A1 * | 2/2005 | Crane | 713/201 |
| 2005/0086300 A1 | 4/2005 | Yeager | |
| 2005/0177385 A1 | 8/2005 | Hull | |
| 2005/0289650 A1 * | 12/2005 | Kalogridis | 726/22 |
| 2006/0212925 A1 * | 9/2006 | Shull et al. | 726/1 |
| 2006/0212931 A1 * | 9/2006 | Shull et al. | 726/10 |
| 2007/0030824 A1 * | 2/2007 | Ribaudo et al. | 370/328 |

OTHER PUBLICATIONS

U.S. Appl. No. 60/658,124 corresponds to Patent Publication 2006/0212925.*
U.S. Appl. No. 60/658,087 corresponds to Patent Publication 2006/0212931.*

* cited by examiner

*Primary Examiner* — Yin-Chen Shaw
(74) *Attorney, Agent, or Firm* — Withrow & Terranova, PLLC

(57) ABSTRACT

Methods, systems, and products are disclosed for measuring trust. A device is encountered. A trust score for the device is calculated and compared to a threshold. The threshold may be a minimum trust score associated with the function. If the calculated trust score equals or exceeds the threshold, then the function is executed. If the calculated trust score is less than the threshold, then the function is denied.

16 Claims, 14 Drawing Sheets

METHODS, SYSTEMS, AND PRODUCTS FOR MEASURING TRUST SCORES OF DEVICES

BACKGROUND

This application particularly relates to calculating trust scores in a networked or peer-to-peer environment.

As communications devices proliferate, security becomes a greater concern. People have desktop computers, laptop and tablet computers, cell phones, personal digital assistants, personal audio devices (e.g., .mp3 players), and many other communications devices. As peoples' devices encounter each other, via networked environments or via peer-to-peer environments, the need for security increases. Because secure connections may not always be possible, or even desirable, what are needed are methods, systems, and products that reduce unwanted or insecure encounters.

SUMMARY

The aforementioned problems, and other problems, are reduced, according to the present invention, using methods, systems, and products that measure the trustworthiness of encountered devices. The present invention describes a software program that continually monitors encounters with other devices. This software program, called a "trust agent," operates within a user's communications device. Whenever the trust agent detects another device, the trust agent calculates a trust score for that encountered device. That is, whenever some other device wishes to send data, exchange data, or otherwise conduct some transaction with the user's communications device, the trust agent first determines whether the other device can be trusted. The trust agent calculates a trust score for that other device. If the calculated trust score equals or exceeds some threshold trust score, then the trust agent approves the encounter. If, however, the calculated trust score does not satisfy the threshold trust score, then the trust agent denies the encounter.

Trustworthiness is calculated using observations from social interactions. That is, the present invention builds upon notions of trust that develop in human interactions. As humans socially interact, humans behaviorally develop and quantify measures of trust. This invention, then, applies those behavioral notions of trust to interactions amongst devices. When a device is encountered, the trust agent measures the trustworthiness of that device. The trust agent collects properties or attributes that can be applied to human notions of trust. When, for example, an encountered device is physically close, more trust may be placed in that proximal device. The trust agent thus applies a general observation of human social interaction—that is, greater trust may be placed in close, physical situations, such as face-to-face negotiations. Other examples of social interactions may be applied to device encounters, and the following paragraphs will describe those examples.

The exemplary embodiments include methods, systems, and products for measuring trust. One such method encounters a device. A trust score is calculated for the device. A threshold trust score is retrieved from memory, and the threshold trust score is a minimum trust score associated with the function. The calculated trust score is compared to the threshold trust score. If the calculated trust score equals or exceeds the threshold trust score, then the function is executed. If the calculated trust score is less than the threshold trust score, then the function is denied.

In another of the embodiments, a system measures trust. The system has a trust agent stored in memory, and a processor communicates with the memory. When the system encounters a device, the processor calculates a trust score for the device. The processor retrieves a threshold trust score from memory, with the threshold trust score having a minimum trust score associated with the function. The processor compares the calculated trust score to the threshold trust score. If the calculated trust score equals or exceeds the threshold trust score, then the trust agent permits execution of the function. If the calculated trust score is less than the threshold trust score, then the trust agent denies the function.

In yet another embodiment, a computer program product measures trust. The computer program product comprises a computer-readable medium storing computer-readable instructions. When a device is encountered, a trust score is calculated for the device. A threshold trust score is retrieved from memory, and the threshold trust score is a minimum trust score associated with the function. The calculated trust score is compared to the threshold trust score. If the calculated trust score equals or exceeds the threshold trust score, then the function is executed. If the calculated trust score is less than the threshold trust score, then the function is denied.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

Figure 1:
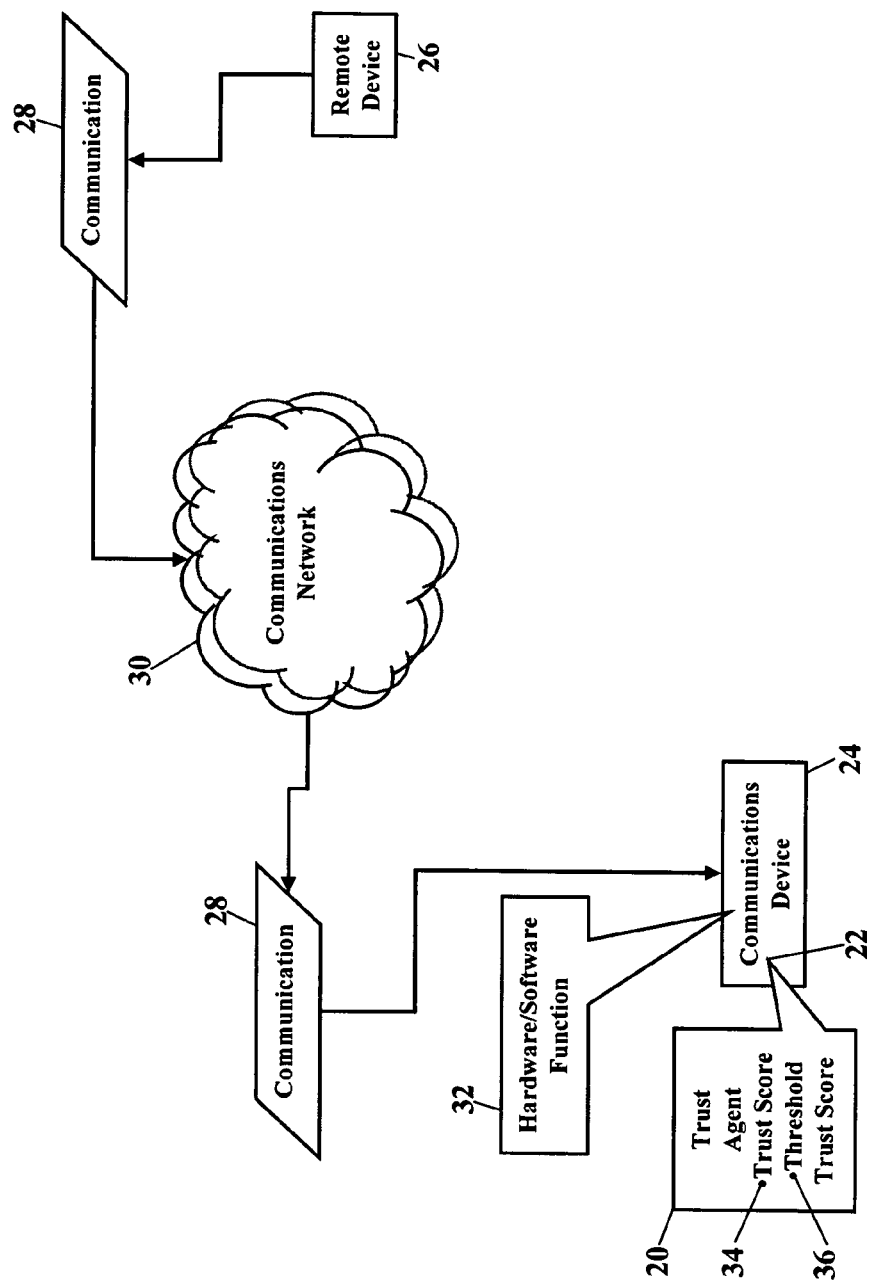
FIG. 1 is a schematic illustrating a trust agent, according to the present invention.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. These functions may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The present invention measures the trustworthiness of encountered devices. The present invention describes a software program that continually monitors for encounters with other devices. This software program, called a "trust agent," operates within a user's communications device. Whenever the trust agent detects another device, the trust agent calculates a trust score for that encountered device. That is, whenever some other device wishes to send data, exchange data, or otherwise conduct some transaction with the user's communications device, the trust agent first determines whether the other device can be trusted. The trust agent calculates a trust score for that other device. If the calculated trust score equals or exceeds some threshold trust score, then the trust agent approves the encounter. If, however, the calculated trust score does not satisfy the threshold trust score, then the trust agent denies the encounter.

Trustworthiness is calculated using observations from social interactions. That is, the present invention builds upon notions of trust that develop in human interactions. As humans socially interact, humans behaviorally develop and quantify measures of trust. This invention, then, applies those behavioral notions of trust to interactions amongst devices. When a device is encountered, the trust agent measures the trustworthiness of that device. The trust agent collects properties or attributes that can be applied to human notions of trust. When, for example, an encountered device is physically close, more trust may be placed in that proximal device. The trust agent thus applies a general observation of human social interaction—that is, greater trust may be placed in close, physical situations, such as face-to-face negotiations. Other examples of social interactions may be applied to device encounters, and this specification will describe those examples.

FIG. 1 is a schematic illustrating a trust agent 20, according to the present invention. The trust agent 20 is a set of processor-executable instructions that are stored in memory 22 of a communications device 24. Although the communications device 24 is generically shown, the communications device 24, as will be later explained, may be a computer, a personal digital assistant (PDA), a cordless/cellular/IP phone, or any other processor-controlled device. Whatever the communications device 24, the trust agent 20 is a software application that measures trust. When the trust agent 20 operates within the communications device 24, the trust agent 24 continually monitors for encounters with other devices. That is, the trust agent 24 detects when one or more other devices wish to send data, exchange data, or otherwise conduct some transaction with the communications device 24. Before that transaction may occur, however, the present invention first determines whether the other device, and/or whether the transaction, can be trusted.

FIG. 1 provides an example. Suppose the communications device 24 encounters another device 26. The terms "encounter," "encounters," and other variants mean the communications device 24 receives a communication 28 from another device 26. The communication 28 communicates via a communications network 30. The communication 28 may be a message or request that wishes to invoke some software or hardware function 32 within the communications device 24. Another device 26, for example, may wish to send an email, send a file, establish a call or other session, or otherwise communicate with the communications device 24. Before the communications device 24 acknowledges the communication 28, and/or before the communications device 24 calls or invokes the requested function 32, the trust agent 20 first determines whether the device 26 can be trusted. That is, the trust agent 20 calculates a trust score 34 for the device 26 and compares that trust score 34 to a threshold trust score 36. The threshold trust score 36 represents a minimum trust score associated with the requested function 32. If that calculated trust score 34 meets or exceeds the threshold trust score 36, then the trust agent 20 permits the communications device 24 to execute the function 32. If, however, the trust score 34 fails to satisfy the threshold trust score 36, then the trust agent 20 denies the function 32.

Figure 2:
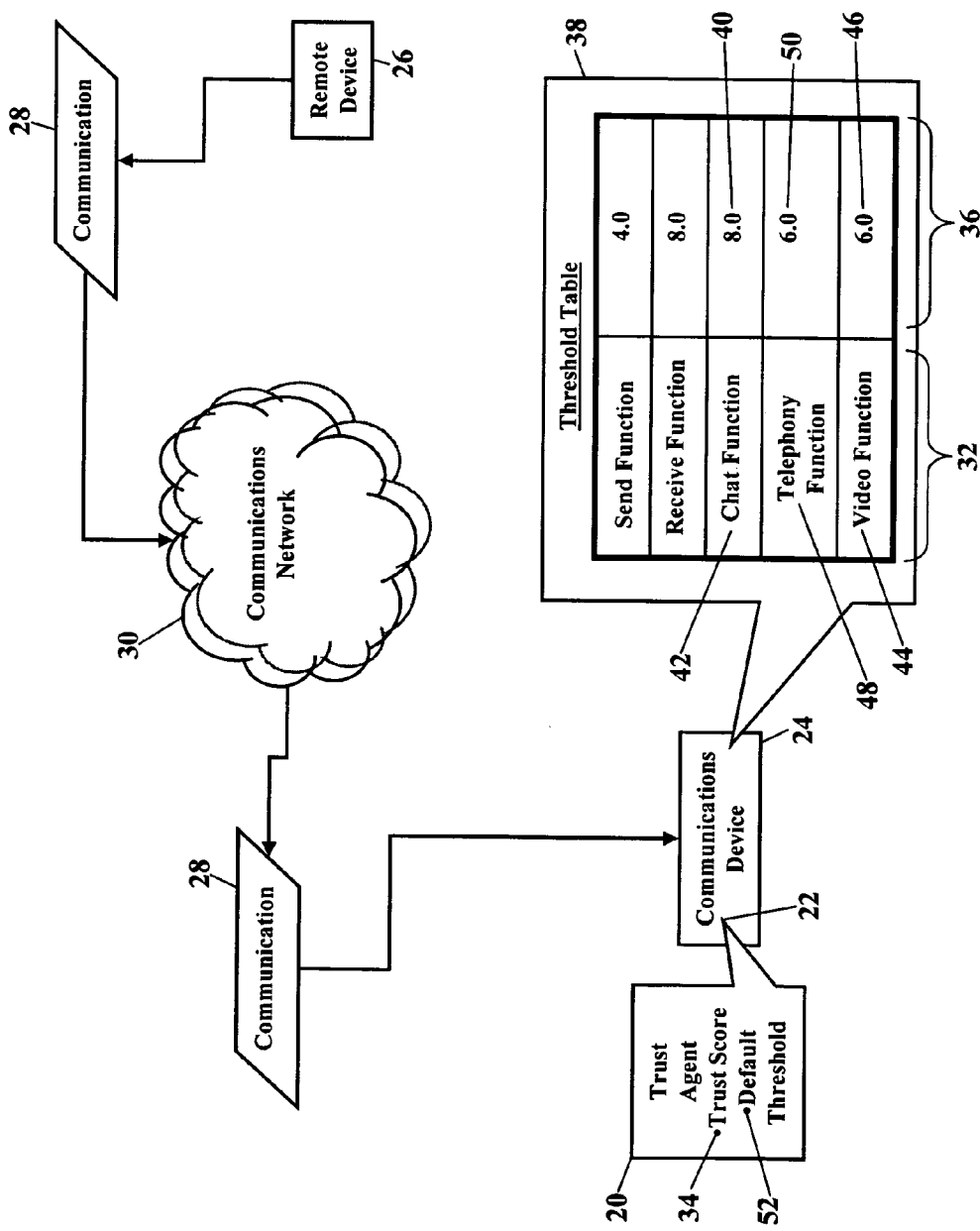
FIG. 2 is a schematic illustrating a threshold table, according to the present invention.

FIG. 2 is a schematic illustrating a threshold table 38, according to the present invention. As the above paragraphs mentioned, the threshold trust score 36 represents a minimum trust score associated with a requested function. The trust agent 20 calculates the trustworthiness of any devices encountered via the communications network (such as the device 26) and compares the trust score 34 to the threshold trust score 36. As FIG. 2 illustrates, the present invention permits different threshold trust scores. That is, each function 34 may have a different threshold trust score 36. As those of ordinary skill in the art understand, the communications device 24 is capable of executing many software and hardware functions. The communications device 24, for example, may execute a send or receive function, an email function, a telephony function (e.g., POTS or VoIP), a video function, and many other functions. Because the various functions are already known and too numerous to list, a more detailed description of the functions is not provided. If the reader desires a more detailed explanation, the reader is invited to consult the following sources, with each incorporated herein by reference in its entirety: all the Wireless Application Protocols (WAP) available from the Open Mobile Alliance, 4275 Executive Square, Suite 240, La Jolla, Calif. USA 92037; all of the PALM® Operating Systems available from PalmSource, Inc., 1188 East Argues Avenue, Sunnyvale, Calif. 94085; all of the WINDOWS® operating systems available from Microsoft Corporation; any of the BLACKBERRY® desktop software applications, handheld software applications, and server applications available from Research In Motion Limited; and all the BLUETOOTH® Specifications, Feature Requirements, and templates available from the Bluetooth Special Interest Group at www.bluetooth.org.

The threshold table 38 maps threshold trust scores to functions. The threshold table 38 stores in the memory 22 of the communications device 24. When the communication 28 is received, the communication 28 requests invocation of the software or hardware function 32 within the communications device 24. The trust agent 20 then queries the threshold table 38 for the threshold trust score associated with that requested function. The trust agent 20 retrieves the appropriate threshold trust score that corresponds to the requested function. As FIG. 2 illustrates, the threshold table 38 may associate a chat threshold trust score 40 to chat communications. That is, when the communication 28 requests a chat session, the trust agent 20 retrieves the chat threshold trust score 40. If the trustworthiness of the device 26 satisfies the chat threshold trust score 40, then the trust agent 20 may permit execution of a chat function 42. Similarly, if a video function 44 is requested, the trust agent 20 retrieves a video threshold trust score 46. If a telephony function 48 is requested, the trust agent 20 retrieves a corresponding telephony trust threshold value 50. The threshold table 38 may be configured to map any desired threshold trust score to any function of the communications device 24. If the communication 28 seeks to send a file, establish a session, exchange data, send data, or otherwise conduct any transaction, the trust agent 20 retrieves the threshold trust score associated with that function.

This invention also includes one or more default threshold trust scores 52. Whenever the trust agent 20 is unable to retrieve a threshold trust score from the threshold table 38, the trust agent 20 may revert to a default threshold trust score. Whenever a threshold trust score is not specified for a requested function, the trust agent 20 may retrieve the same or different default threshold trust score. Suppose an error occurs within the memory structure of the threshold table 38. In such circumstances the trust agent 20 may or may not utilize the default threshold trust score 52. If the communication 28 requests a function that is not available, a default threshold trust score 52 may be retrieved to prevent an error or invalid operating condition. A user of the communications device 24, in fact, may specify any number of default threshold trust scores for any condition or circumstance that may occur.

This invention also provides for nested functions. Whenever the communication 28 requests two or more functions, the threshold table 38 may be configured to specify one or more corresponding thresholds. Suppose, for example, the communication 28 requests receipt of an electronic communication, and that electronic communication itself includes a webpage link to download content. Here, then, the communications device 24 is requested to not only receive the electronic communication, but the communications device 24 is also requested to download content from a remote server. These "nested" functions may cause the trust agent 20 to retrieve one or more threshold trust scores. The trust agent 20 could separately apply each threshold trust score to each function. The trust agent 20, however, may also choose and apply the higher (or the lower) threshold trust score. When multiple threshold trust scores are retrieved, the trust agent 20 may filter the results according to a user-configurable rule. The user, in fact, may establish many rules describing many different situations. Each rule would be stored in the memory 22 and recalled and applied when matching parameters are detected.

Figure 3:
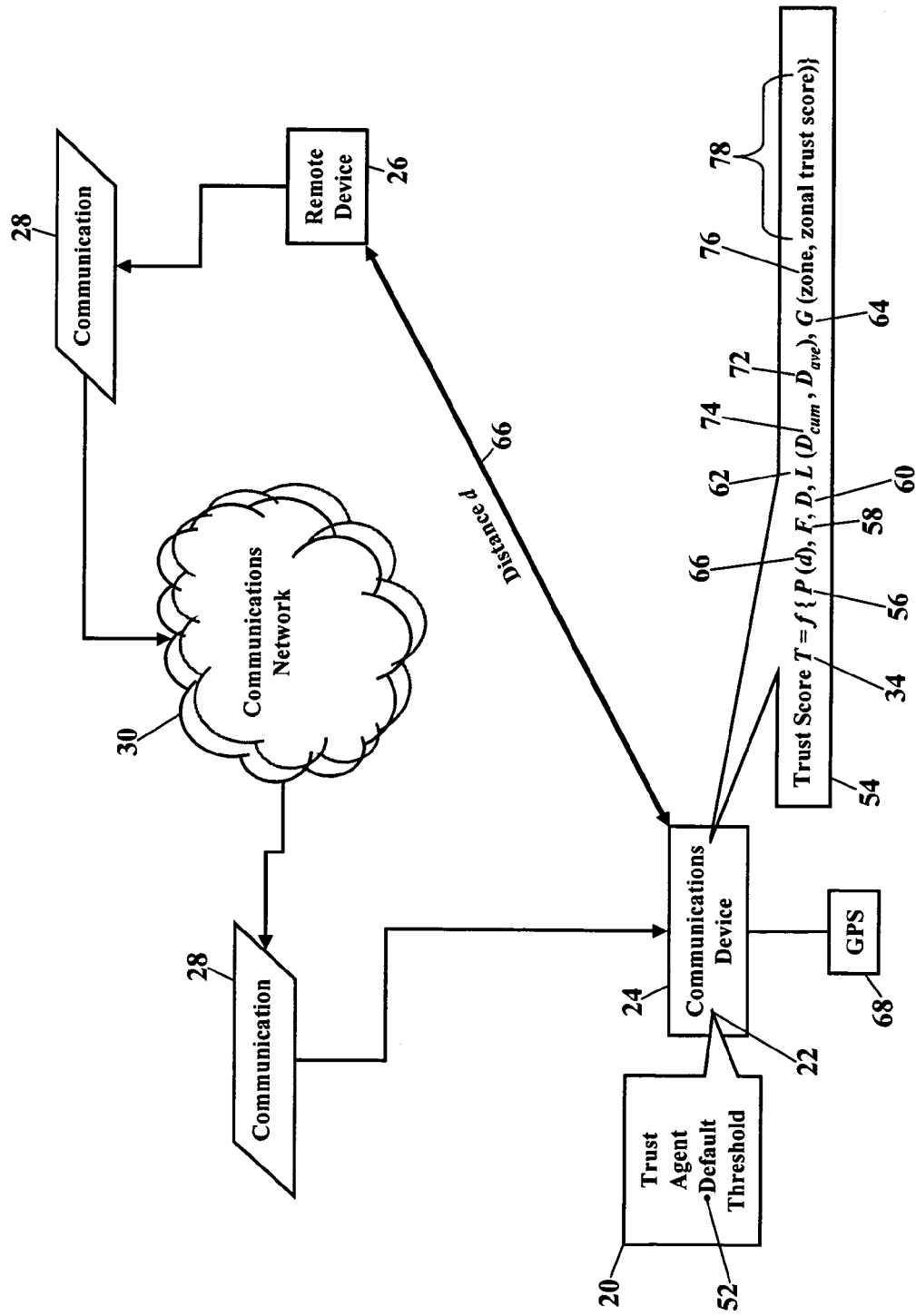
FIGS. 3 and 4 are schematics illustrating a trust equation, according to the present invention.

FIG. 3 is a schematic illustrating a trust equation 54, according to the present invention. As the above paragraphs explained, the trust agent 20 determines the trustworthiness of any device encountered via the communications network 30. The trust agent 20 uses the trust equation 54 to calculate the trust score 34. Whenever the communications device 24 detects another device (such as the device 26), the trust agent 20 evaluates the trustworthiness of that device 26. The trust agent 20 calculates and logs the trust score 34 and compares it to the threshold trust score 36. If the calculated trust score 34 meets or exceeds the threshold trust score 36, then the trust agent 20 permits whatever function is requested. If, however, the trust score 34 fails to satisfy the threshold trust score 36, then the trust agent 20 denies the requested function.

While the trust equation 54 may be any equation suitable to implement the current invention, here the trust equation 54 is a function of one or more components or variables. FIG. 3, for example, illustrates a proximity component P (shown as reference numeral 56), a frequency component F (shown as reference numeral 58), a durational component D (shown as reference numeral 60), a longevity component L (shown as reference numeral 62), and a geographical component G (shown as reference numeral 64). The trust equation 54 may include any combination of these components. The trust equation 54, in fact, may include any other factors, variables, or values that help determine the trustworthiness of encountered devices.

The proximity component P is a measure of closeness. When the device 26 is near, the proximity component P has a higher value. When the device 26 is far away, the proximity component P has a lower value. The proximity component P is thus inversely proportional to a distance d between the communications device 24 and the other device 26 (the distance d is shown as reference numeral 66). Because the proximity component P has a higher value when the device 26 is near, the trust agent 20 reflects a general observation of social interaction—greater trust may be placed in face-to-face negotiations. The closer the device 26, the more content received from the device 26 can be trusted. This general observation, of course, is not always true, and other components of the trust equation 54 may outweigh or negate the proximity component P. Yet the proximity component P applies greater trust in proximate physical situations.

The proximity component P may use various methods to determine distance. The proximity component P calculates, approximates, or infers the distance d between the communications device 24 and the other device 26 (the distance d is shown as reference numeral 66). The trust agent 20 may use a Global Positioning System 68 and/or triangulation to determine the distance d. The trust agent 20, for example, interfaces with the Global Positioning System 68 and, thus, knows the GPS coordinates of the communications device 24. The trust agent 20 may also receive the GPS coordinates of the other device 26. The other device 26, for example, may broadcast its GPS coordinates. The other device 26 may include its GPS coordinates in the communication 28. The trust agent 20 may additionally or alternatively query a server/database (not shown for simplicity) for the GPS coordinates of the other device 26. This server/database stores location information associated with the other device 26. The trust agent 20 may then calculate a linear or radial distance between these two GPS coordinates. The trust agent 20 may additionally or alternatively use triangulation to determine the distance d.

The trust agent 20 may also infer distance based upon a communications standard. When, for example, the communications device 24 and the other device 26 communicate via the Industrial, Scientific, and Medical band (ISM) of the electromagnetic spectrum (such as the BLUETOOTH® standard), the trust agent 20 may infer a higher trust. Because the ISM band only has a useful, short range, the trust agent 20 may infer that the device 26 is relatively close. Infrared transmissions, likewise, have a short range, so higher trust may be inferred. Various trust measures may also be inferred for other frequencies. Cellular transmissions, on the other hand, may have lower inferences of trust, simply because the range of the cellular frequencies is greater. Trust may even be inferred from Wireless-Fidelity (or "Wi-Fi") data rates. Because a gradual degradation in range occurs, the slower the transmission data rate, the less trust may be placed in the I.E.E.E. 802 family of standards. Higher Wi-Fi transmission data rates have greater trust, while lower transmission data rates have lower trust.

The trust agent 20 may also utilize other mechanisms to infer distance. The trust agent 20 may use timing measurements to determine distance. The trust agent 20, for example, may "ping" or prompt the other device 26 for a response. The time for receipt of the response may then be used (along with propagation rate) to determine or infer distance. The proximity component P, then, may emphasize closeness over distance. If the other device 26 is within a range of distances, the proximity component P may have a greater value. If, for example, the device 26 is within 0-100 feet, the proximity component P may have a greater value than if the device 26 were a half-mile or more.

The proximity component P may additionally or alternatively have a cumulative value. That is, the proximity component P may be a cumulative factor and not necessarily an individual instance factor. Suppose, for example, the device 26 is encountered ten times, and each of those encounters was within one hundred (100) feet. The proximity component P, however, may emphasize fewer, but closer, encounters. The proximity component P may place more trust in nine (9) previous encounters that were within ten (10) feet.

FIG. 3 also illustrates the frequency component F (shown as reference numeral 58). The frequency component F indicates previous encounters with the device 26. The frequency component F stores and counts the number of previous encounters with the device 26. If the device 26 has a history of encounters, then the frequency component F has a greater value. The frequency component F thus reflects another general observation of social interaction—if previous encounters were harmless, then higher trust can be placed in future encounters. The frequency component F, then, resembles a counter of past encounters with the device 26. If the frequency component F is zero, or a low value, then the trust equation 54 may yield a lower trust score. When, however, the device 26 has a history of many encounters, then the trust equation 54 may yield a higher trust score. The frequency component F may also be influenced by time. That is, recent encounters may be more valued or trustworthy than old encounters. The frequency component F may de-emphasize encounters that are older than a predetermined, configurable date and/or time (e.g., months, days, hours, or any unit of time). The frequency component F may thus be more influenced by ten (10) encounters yesterday than ten (10) encounters last year.

FIG. 3 also illustrates the durational component D (shown as reference numeral 60). The durational component D measures a time duration of the current encounter with the device 26. If the trust agent 20 only detects a short encounter, then the durational component D has a lower value. As the time of the encounter grows, however, the durational component D has a higher value. The durational component D thus reflects yet another general observation of social interaction—the longer an encounter, the more trust we may place in that encounter. The durational component D, then, resembles a timer for the current encounter. The durational component D may be measured or calculated using any time units. If the durational component D has a low value, then the trust equation 54 may yield a lower trust score. When, however, the durational component D has a larger value, then the trust equation 54 may yield a higher trust score.

FIG. 3 also illustrates the longevity component L (shown as reference numeral 62). The longevity component L is another measure of historical encounters. The longevity component L may represent an average duration $D_{ave}$ of all previous encounters with the device 26 (the average duration $D_{ave}$ is shown as reference numeral 72). The longevity component L may additionally or alternatively represent a cumulative duration $D_{cum}$ of all previous encounters with the device 26 (the cumulative duration $D_{cum}$ is shown as reference numeral 74). If the trust agent 20 only detects a short average duration $D_{ave}$, and/or a low cumulative duration $D_{cum}$, then the longevity component L has a lower value. As either the average duration $D_{ave}$ and/or the cumulative duration $D_{cum}$ grows, the longevity component L has a higher value. The longevity component L thus reflects still another general observation of social interaction—the longer our previous encounters, the more trust we may place in a current encounter. The longevity component L, then, resembles statistical timer for all previous encounters. The longevity component L may be measured or calculated using any units. If the longevity component L has a low value, then the trust equation 54 may yield a lower trust score. When, however, the longevity component L has a larger value, then the trust equation 54 may yield a higher trust score.

Figure 4:
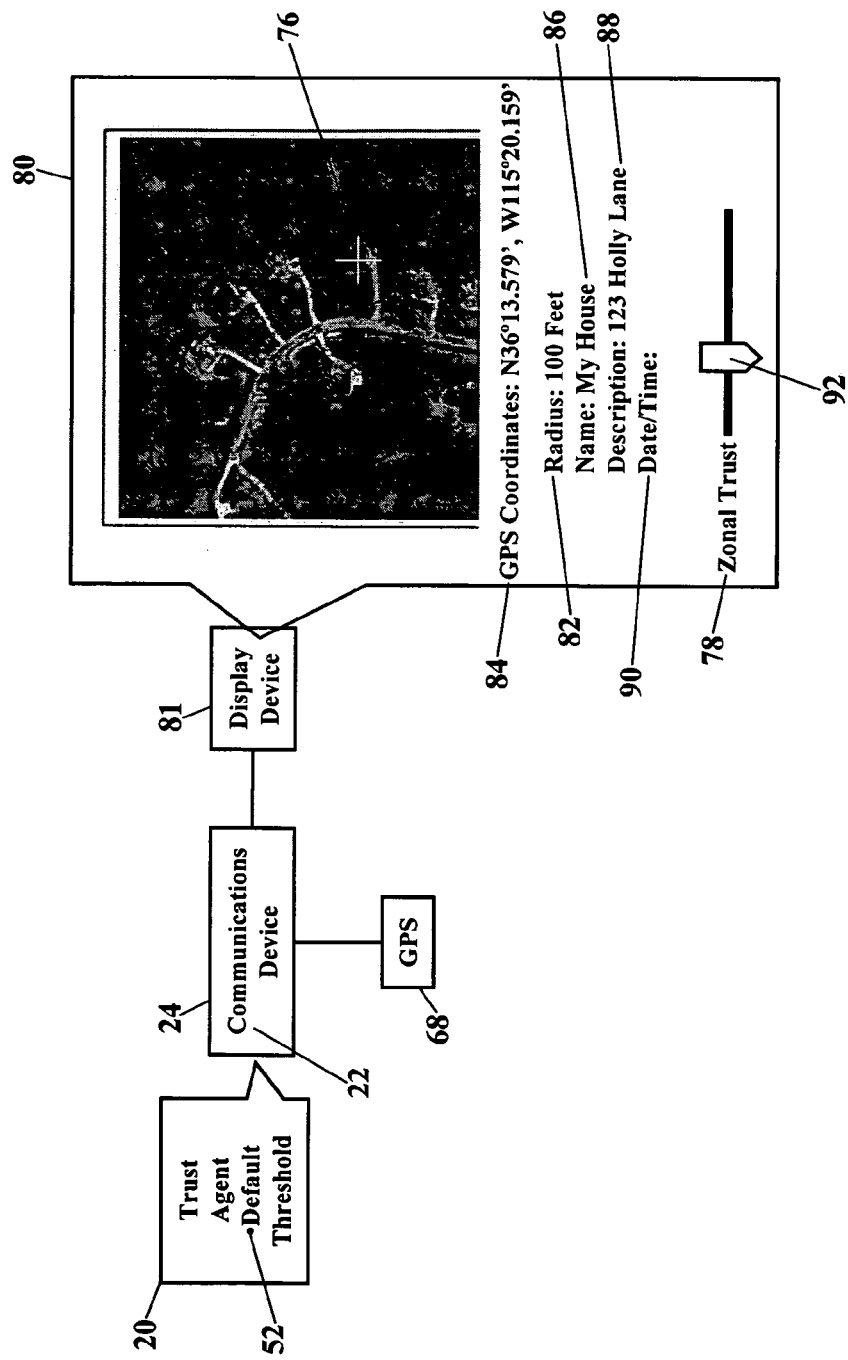

FIGS. 3 and 4 also illustrate the geographical component G (shown as reference numeral 64). The geographical component G defines a geographic zone 76 from which encounters with devices are assigned a zonal trust score 78. The geographical component G reflects another general observation of social interaction—some locations or locales are more trusted than others. A user of the trust agent 20 may define a geographic zone and then assign a trust score to that zone. Our home, for example, may have a higher trust score than an unknown location. FIG. 4, then, illustrates a graphical user interface 80 for defining a geographic zone. The graphical user interface 80 is visually presented on a display device 81 associated with the communications device 24. The user selects a radius 82 about a GPS coordinate 84. The user also assigns the zonal trust score 78 to that geographic zone. If the communications 34 is sent, received, or originates from within the radius 82 of the GPS coordinate 84, then the trust agent 20 assigns the zonal trust score 78 to the geographical component G. The graphical user interface 80 may also permit the user to assign a name 86 and a descriptor 88 to the geographic zone 76.

The zonal trust score 78 may also be based on a time of day. As FIG. 4 also illustrates, the graphical user interface 80 may also permit the user to assign a date and time 90 to the zonal trust score 78. That is, the user can assign different zonal trust scores to different times of day for the same geographic zone. The geographical component G again reflects another general observation of social interaction—some locations have a higher level of trust a certain times of day. A downtown street, for example, may have one zonal trust score during business hours, yet that same downtown street may have a different zonal trust score during the night. A college student, however, may assign a higher trust score to evening encounters than daytime encounters. Whatever the user's situation, the graphical user interface 80 may also permit the user to assign different zonal trust scores based on the day of the week and/or the time of day.

The geographical component G may also have additional definitions. Geographic zones may be user-defined and/or community-defined. User defined geographic zones are locally stored in the memory 22 of the at the communications device 24, while community-defined geographic zones are stored on and retrieved from a remote server. User-defined zones are utilized to help distinguish trusted zones, such as the user's house, school, or place of work. Community-defined zones, on the other hand, utilize a community of mobile device users to collectively assign trust scores to public locations such as churches, libraries, schools, and downtown areas. If a geographic zone does not have an associated zonal trust score, then the trust agent may query the server for an associated community-defined zonal trust score. The trust agent 20 may even query a trusted device to determine whether a geographic location or zone has been assigned a zonal trust score. That is, if another device has an acceptable trust score, and if that device has assigned a zonal trust score, then the trust agent 20 may retrieve that zonal trust score from the device. FIG. 4 illustrates a slider control 92 for selecting the zonal trust score 78, yet the present invention includes any means for inputting, entering and/or selecting the zonal trust score 78.

Figure 5:
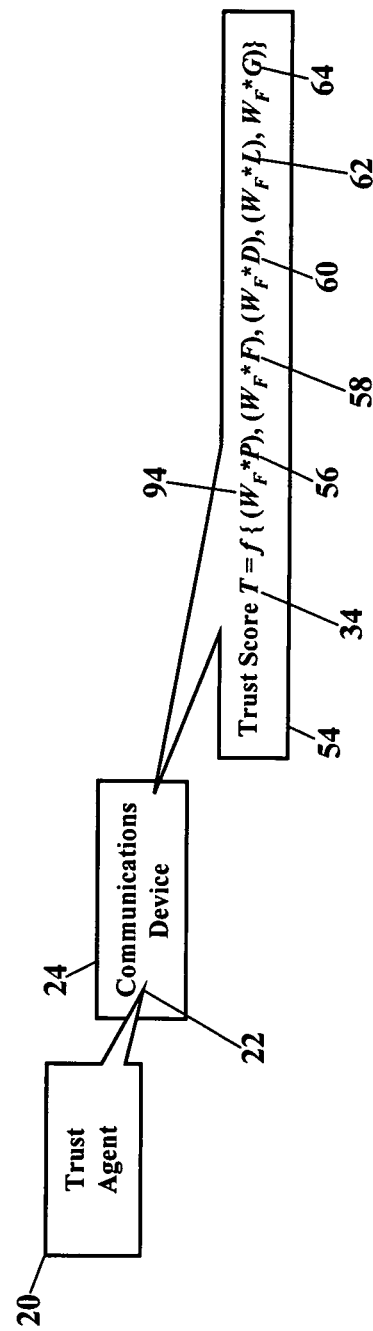
FIG. 5 is a schematic illustrating weighting factors, according to the present invention.

FIG. 5 is a schematic illustrating weighting factors, according to the present invention. The trust equation 54 may be any equation of any form, and the trust equation 54 is a function of one or more components or variables. FIG. 5 illustrates the proximity component P (shown as reference numeral 56), the frequency component F (shown as reference numeral 58), the durational component D (shown as reference numeral 60), the longevity component L (shown as reference numeral 62), and the geographical component G (shown as reference numeral 64). Here, however, the trust equation 54 may also include one or more weighting factors $W_F$ (shown as reference numeral 94). These weighting factors 94 permit the user to emphasize, or de-emphasize, any component. Each component may have its own weighting factor, and each weighting factor may have any value the user desires. A higher weighting factor provides greater influence for that component, while a lower weighting factor reduces the influence of that component.

Figure 6:
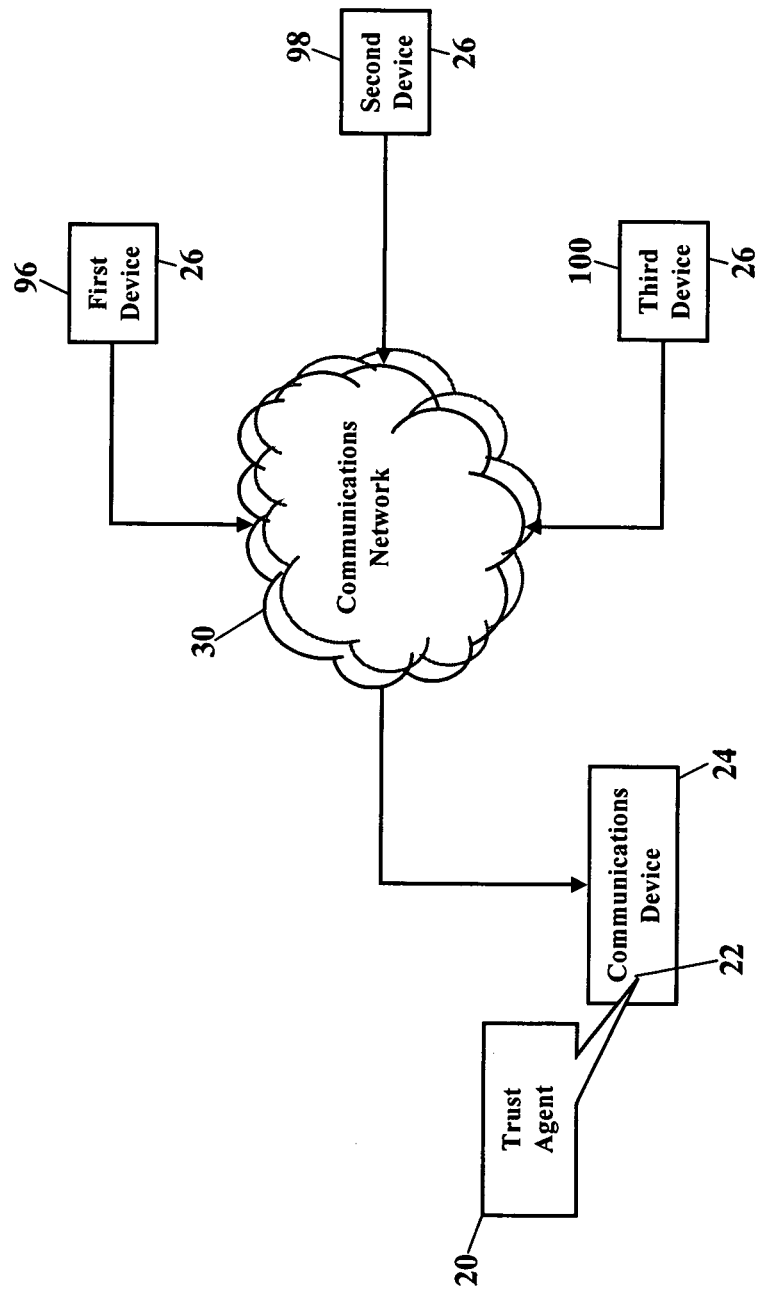
FIGS. 6 and 7 are schematics illustrating multiple encountered devices, according to the present invention.
Figure 7:
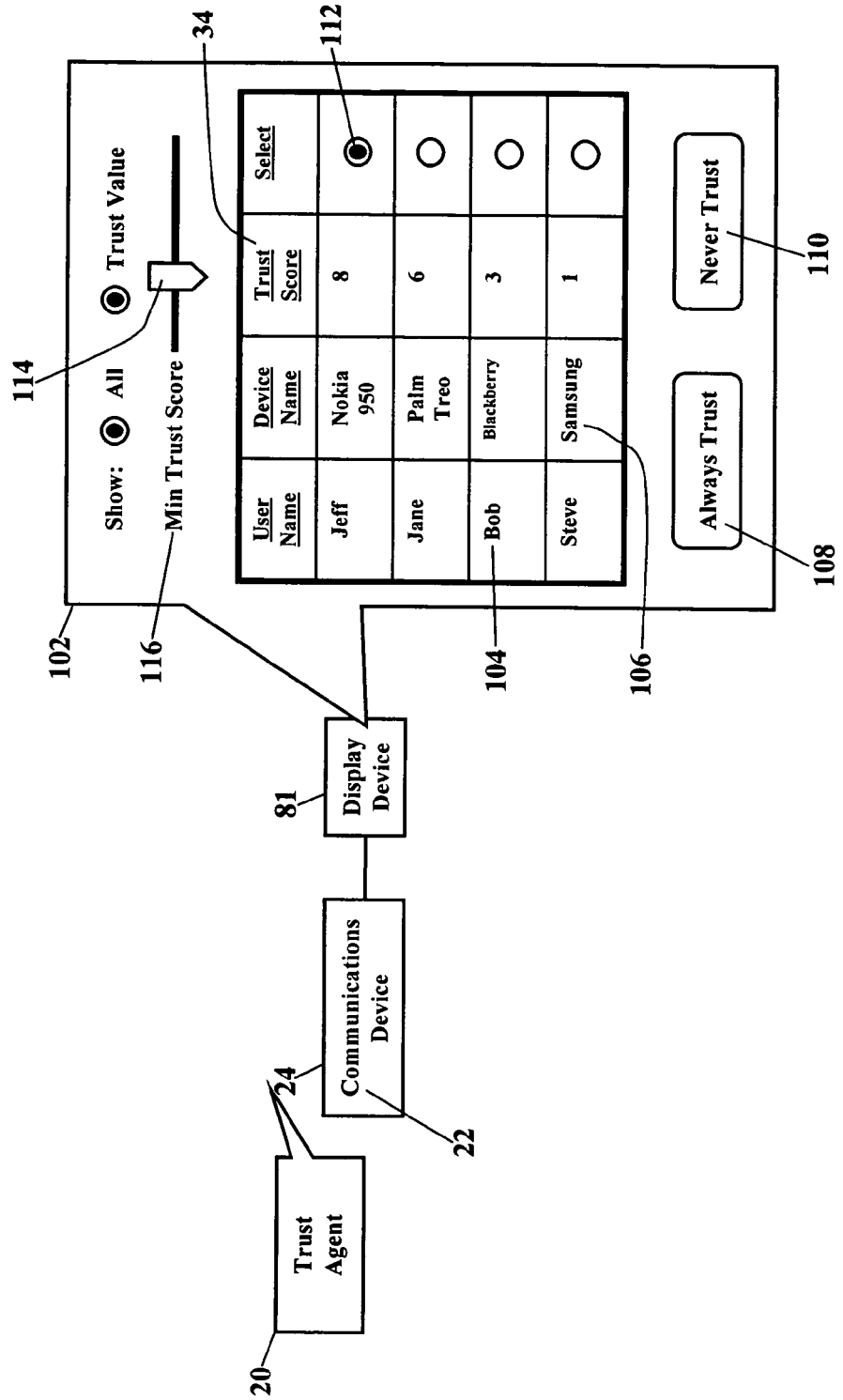

FIGS. 6 and 7 are schematics illustrating multiple encountered devices, according to the present invention. As FIG. 6 illustrates, the trust agent 20, operating within the communications device 24, may encounter multiple devices 26. The trust agent 20 encounters these devices 26 via the communications network 30. The trust agent 20, for example, may encounter a first device 96 via a peer-to-peer connection over an I.E.E.E. 802 network. The trust agent 20 may encounter a second device 98 over a cellular connection. A third device 100 may be encountered via a BLUETOOTH® connection. Regardless of how the trust agent 20 encounters other devices, the trust agent 20 continually monitors for encounters and calculates a trust score for each encountered device 26.

FIG. 7 illustrates a user interface 102. The user interface is visually presented on the display device 81 associated with the communications device 24: Here the user interface 102 visually lists all the devices the trust agent 20 is encountering. The user interface 102 also audibly and/or visually presents the trust score 34 associated with each encountered device. The user interface 102 may also illustrates a user name 104 and/or a device name 106 associated with each encountered device. The user may thus quickly review the user interface 102 and immediately know the identity of encountered devices. The user may also quickly know the trust score 34 associated with any encountered device.

The user may also manually override trust scores. As FIG. 7 illustrates, the user may "click" or otherwise tactilely select an "Always Trust" control button 108 or a "Never Trust" control button 110. Regardless of an encountered device's trust score 34, the user can manually override the trust agent 20. If the user wishes to manually override the trust agent 20, the user tactilely selects the desired device (such as that indicated by reference numeral 112) and then selects whether the trust agent 20 should "Always Trust" or "Never Trust" the selected device. The trust agent 20 may then ignore that selected device's trust score, or the trust agent 20 may cease calculating that device's trust score to conserve processing and battery power. The user may also make selections using any user interface, such as an audio interface with voice recognition.

The user may also filter trust scores. Because the trust agent 20 may encounter multiple devices, the user may only wish to know of those devices having a minimum trust score. That is, the user does not want to know of devices having an undesirable trust score. The user interface 102, then, includes a control 114 to select a minimum trust score 116. If an encountered device's trust score is below the minimum trust score 116, then the user may configure the user interface 102 to ignore that untrustworthy device. FIG. 7 illustrates the control 114 as a slider control, whereby the user moves or slides the control 114 to vary the minimum trust score 116. The slider control, however, is only one such configuration for varying the minimum trust score 116. The present invention includes any means for varying the minimum trust score 116. The present invention may utilize any means for graphically indicating the variable minimum trust score 116. The user may also filter current and historical devices. At some time the user may only wish to view trust scores for currently encountered devices. At other times, however, the user may wish to view a historical listing of all encountered devices. The user may even configure a date at which historically encountered devices are removed from the user interface 102. Devices not encountered since that date would not be listed. One or more controls would allow the user to select the date and/or the historical listing.

The trust equation 54, as earlier mentioned, may be any equation suitable to implement the current invention. One exemplary form of the trust equation is presented below:

$$T = \left(\frac{1}{6}\right)\left[\frac{(W_P * P) + (W_F * F) + (W_D * D) + (W_L * L) + (W_{Guser} * G_{user}) + (W_{Gcomm} * G_{comm})}{(W_{Guser} + W_{Gcomm} + W_P + W_F + W_D + W_L)}\right]$$

Here the trust equation 54 is expressed as a quotient involving the proximity component P, the frequency component F, the durational component D, the longevity component L, and the geographical component G. The trust equation 54 may also include the one or more weighting factors $W_F$. A weighting factor $W_P$, for example, is a weighting factor associated with the proximity component P. A weighting factor $W_F$, likewise, is the weighting factor associated with the frequency component F. The weighting factors $W_D$, $W_L$, $W_{Guser}$, and $W_{Gcomm}$ are the weighting factors associated with the durational component D, the longevity component L, the user-defined geographical component $G_{user}$, and the community-defined geographical component $G_{comm}$. These weighting factors permit the user to emphasize, or de-emphasize, any component. This form of the trust equation 54 yields a trust score within the range [0, 10]. A trust score T of zero (T=0) is the lowest level of trust, while a trust score T of ten (T=10) is the highest level of trust. This form of the trust equation 54 thus normalizes each component to a value between zero (0) and ten (10). This form of the trust equation 54 also sets a default weighting factor for each component to six ($W_F$=6). The user, of course, may modify any weighting factor to suit the user's desires. If any component has an indeterminate, null, or erroneous value, that component may be ignored.

Figure 8:
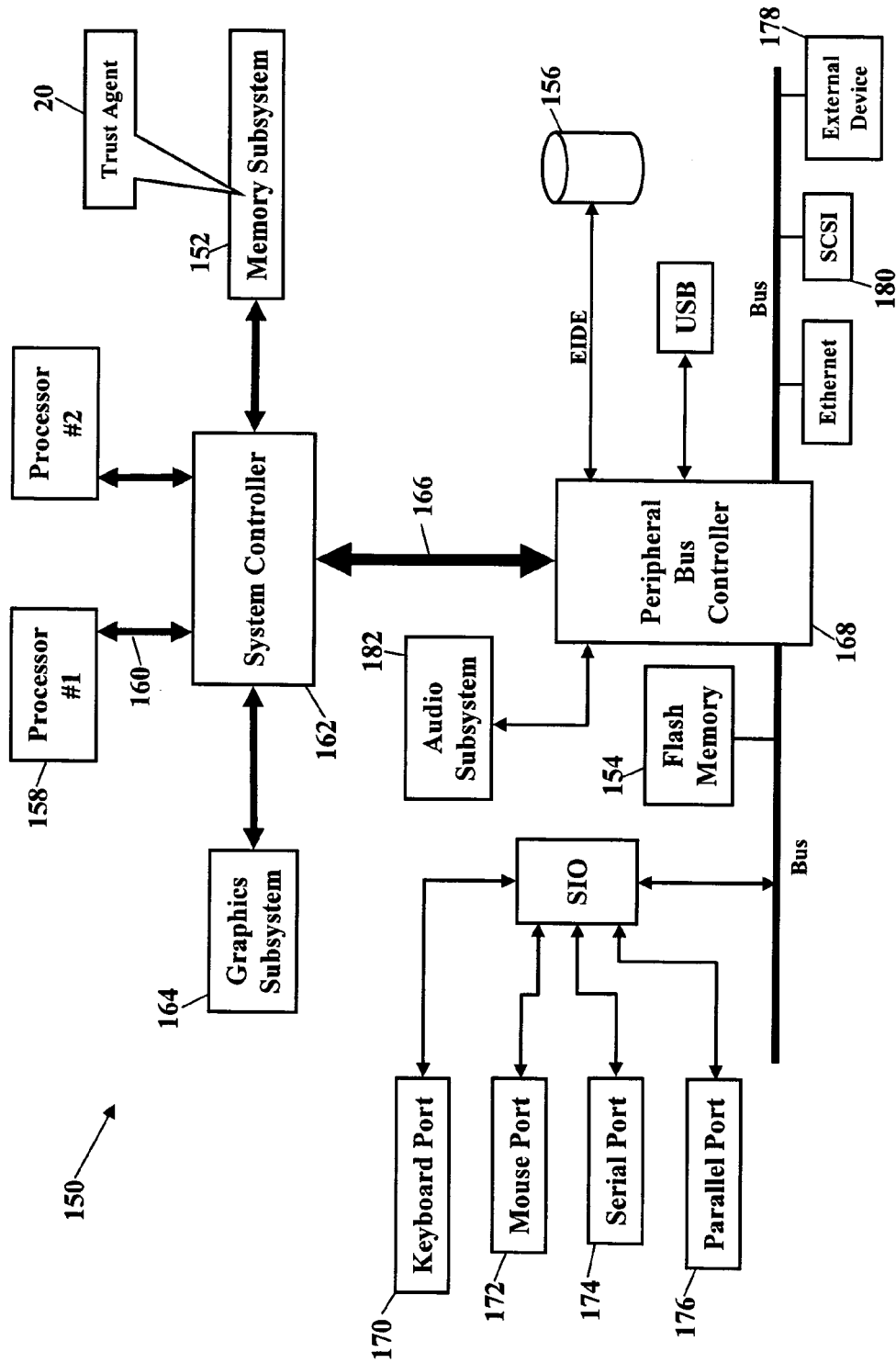
FIG. 8 depicts a possible operating environment for the present invention.

FIG. 8 depicts a possible operating environment for the present invention. FIG. 8 is a block diagram showing the trust agent 20 residing in a processor-controlled system 150 (such as the communications device 24 shown in FIGS. 1-7). FIG. 8, however, may also represent a block diagram of any computer or communications device in which the trust agent 20 may operate. The trust agent 20 operates within a system memory device. The trust agent 20, for example, is shown residing in a memory subsystem 152. The trust agent 20, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Other operating systems could also include any of the PALM® Operating Systems available from PalmSource, Inc., 1188 East Argues Avenue, Sunnyvale, Calif. 94085 and any of the BLACKBERRY® desktop software applications, handheld software applications, and server applications available from Research In Motion Limited. Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a subscriber of the computer system 150.

Figure 9:
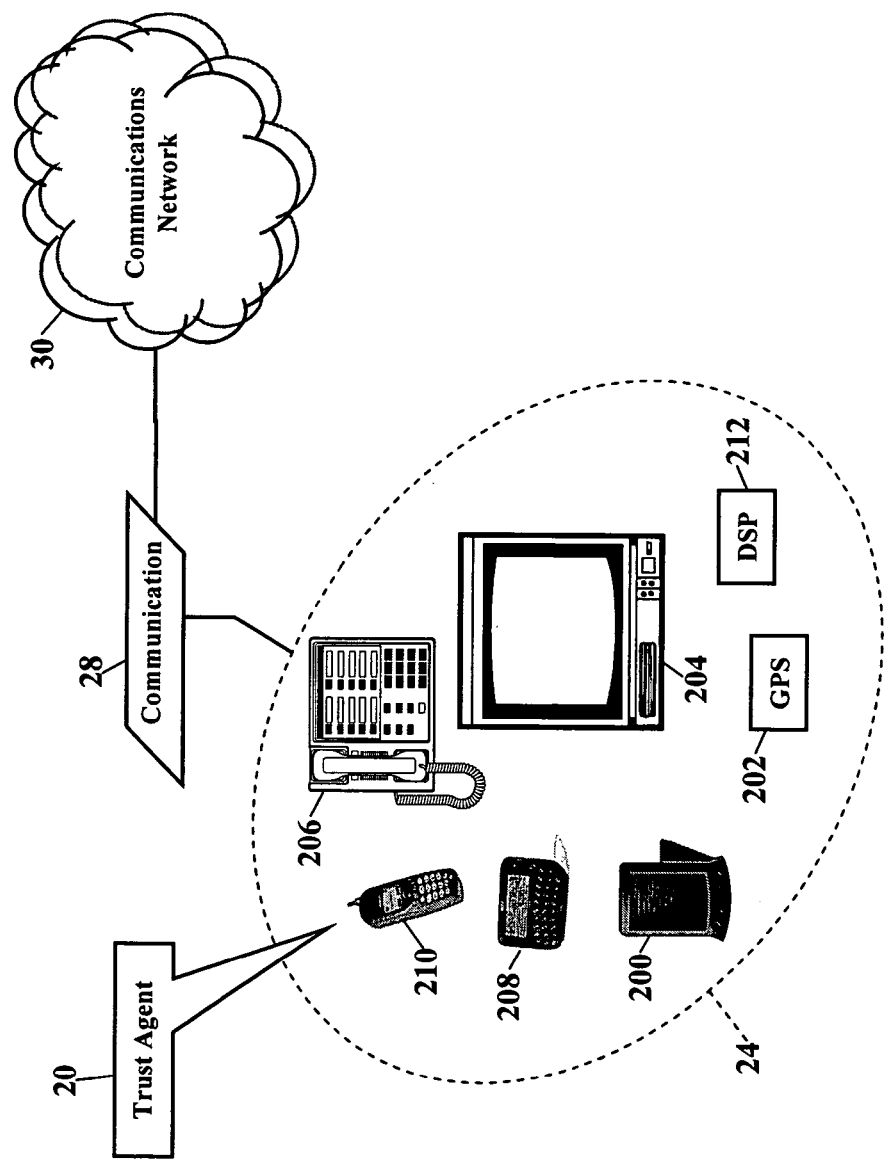
FIG. 9 is a schematic illustrating the trust agent operating within various other communications devices.

FIG. 9 is a schematic illustrating still more exemplary embodiments. FIG. 9 illustrates that the trust agent 20 may alternatively or additionally operate within various other communications devices 24. FIG. 9, for example, illustrates that the trust agent 20 may entirely or partially operate within a personal digital assistant (PDA) 200, a Global Positioning System (GPS) device 202, an interactive television 204, an Internet Protocol (IP) phone 206, a pager 208, a cellular/satellite phone 210, or any computer system and/or communications device utilizing a digital signal processor (DSP) 212. The communications device 24 may also include watches, radios, vehicle electronics, clocks, printers, gateways, and other apparatuses and systems.

Figure 10:
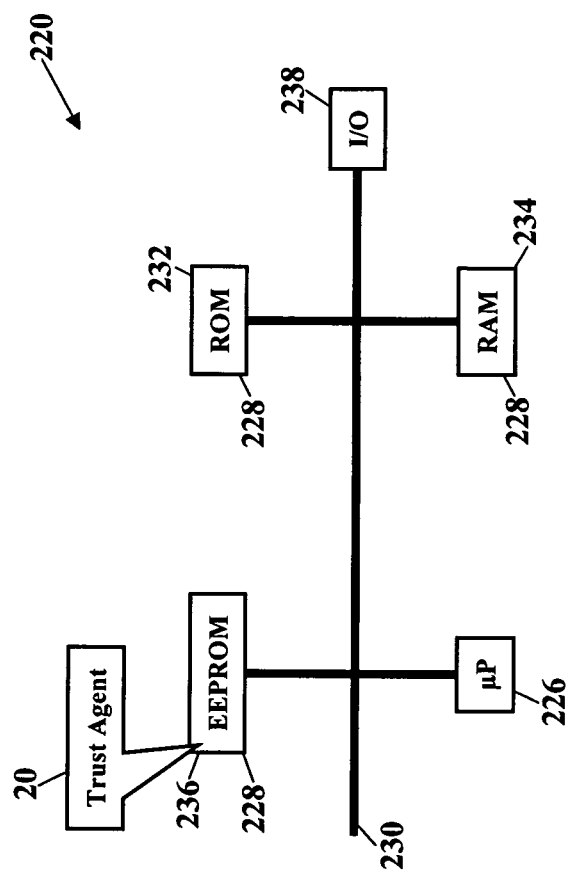
FIGS. 10-12 are schematics further illustrating various other communications devices for measuring trust, according to the present invention.
Figure 11:
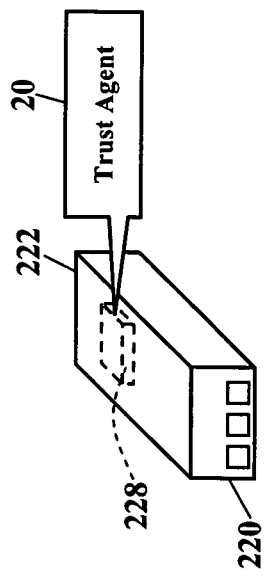
Figure 12:
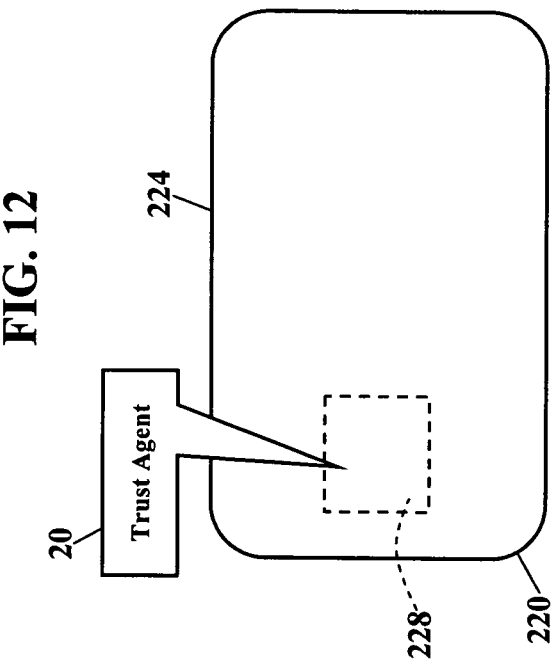

FIGS. 10-12 are schematics further illustrating various other communications devices for measuring trust, according to the present invention. FIG. 10 is a block diagram of a Subscriber Identity Module 220, while FIGS. 11 and 12 illustrate, respectively, the Subscriber Identity Module 220 embodied in a plug 222 and the Subscriber Identity Module 220 embodied in a card 224. As those of ordinary skill in the art recognize, the Subscriber Identity Module 220 may be used in conjunction with many communications devices (such as the communications devices 24 shown in FIG. 9). The Subscriber Identity Module 220 stores subscriber information (such as the subscriber's International Mobile Subscriber Identity, the subscriber's K, number, and other subscriber information), perhaps the subscriber's profile (shown as reference numeral 108), and any portion of the trust agent 20. As those of ordinary skill in the art also recognize, the plug 222 and the card 224 each interface with the communications device according to GSM Standards 2.17 and 11.11 and ISO Standard 7816, with each incorporated herein by reference. The GSM Standard 2.17 is formally known as "European digital cellular telecommunications system (Phase 1); Subscriber Identity Modules, Functional Characteristics (GSM 02.17 V3.2.0 (1995-01))." The GSM Standard 11.11 is formally known as "Digital cellular telecommunications system (Phase 2+) (GSM); Specification of the Subscriber Identity Module—Mobile Equipment (Subscriber Identity Module—ME) interface (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "Information technology—Identification cards—Integrated circuit(s) cards with contacts," and the standard is available from the International Organization for Standardization (ISO) (1, rue de Varembé, Case, postale 56CH-1211 Geneva 20, Switzerland, Telephone +41 22 749 01 11, Telefax +41 22 733 34 30, www.iso.org).

FIG. 10 is a block diagram of the Subscriber Identity Module 220, whether embodied as the plug 222 of FIG. 11 or as the card 224 of FIG. 12. Here the Subscriber Identity Module 220 comprises a microprocessor 226 (μP) communicating with memory modules 228 via a data bus 230. The memory modules may include Read Only Memory (ROM) 232, Random Access Memory (RAM) and or flash memory 234, and Electrically Erasable-Programmable Read Only Memory (EEPROM) 236. The Subscriber Identity Module 220 stores some or all of the trust agent 20 in one or more of the memory modules 228. FIG. 10 shows the trust agent 20 residing in the Erasable-Programmable Read Only Memory 236, yet the trust agent 20 could alternatively or additionally reside in the Read Only Memory 232 and/or the Random Access/Flash Memory 234. An Input/Output module 238 handles communication between the Subscriber Identity Module 220 and the communications device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 13:
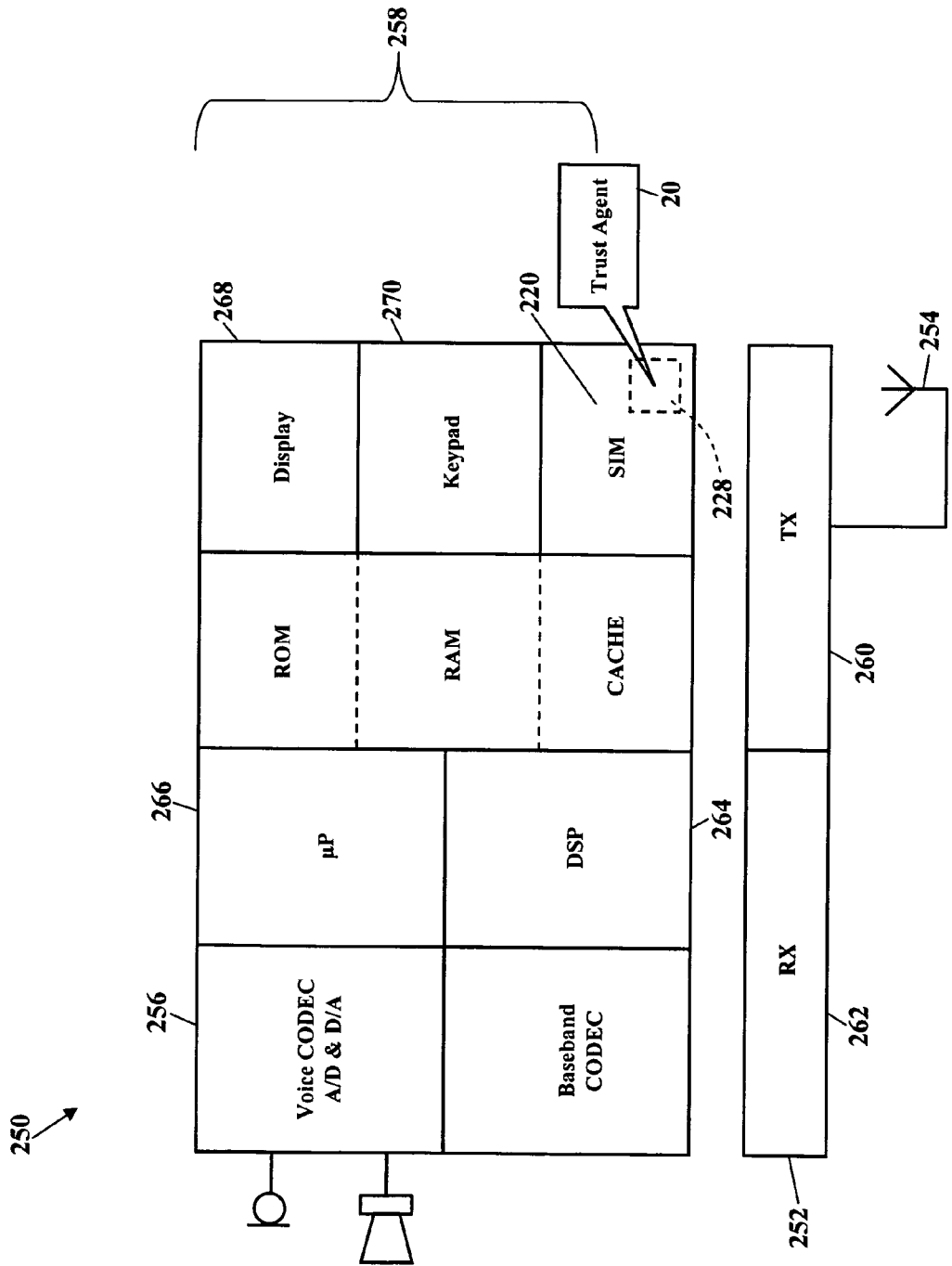
FIG. 13 is a block diagram of another communications device utilizing any portion of the trust agent.

FIG. 13 is a schematic further illustrating various communications devices for measuring trust, according to the present invention. FIG. 13 is a block diagram of another communications device 250 utilizing any portion of the trust agent 20. In one embodiment, the communications device 250 comprises a transceiver unit 252, an antenna 254, a digital baseband chipset 256, and a man/machine interface (MMI) 258. The transceiver unit 252 includes transmitter circuitry 260 and receiver circuitry 262 for receiving and transmitting electromagnetic signals of any frequency. The transceiver unit 252 couples to the antenna 254 for converting electrical current to and from electromagnetic waves. The digital baseband chipset 256 contains a digital signal processor (DSP) 264 and performs signal processing functions. As FIG. 13 shows, the digital baseband chipset 256 may also include an on-board microprocessor 266 that interacts with the man/machine interface (MMI) 258. The man/machine interface (MMI) 258 may comprise a display device 268, a keypad 270, and/or the Subscriber Identity Module 220. The on-board microprocessor 266 performs control functions for the radio circuitry 260 and 262, for the display device 268, and for the keypad 270. The on-board microprocessor 266 may also interface with the Subscriber Identity Module 220 and with the trust agent 20 residing in the memory module 228 of the Subscriber Identity Module 220. Those skilled in the art will appreciate that there may be many suitable architectural configurations for the elements of the communications device 250. The componentry and operating principles for the communications device 250 are well and, thus, not further described.

Figure 14:
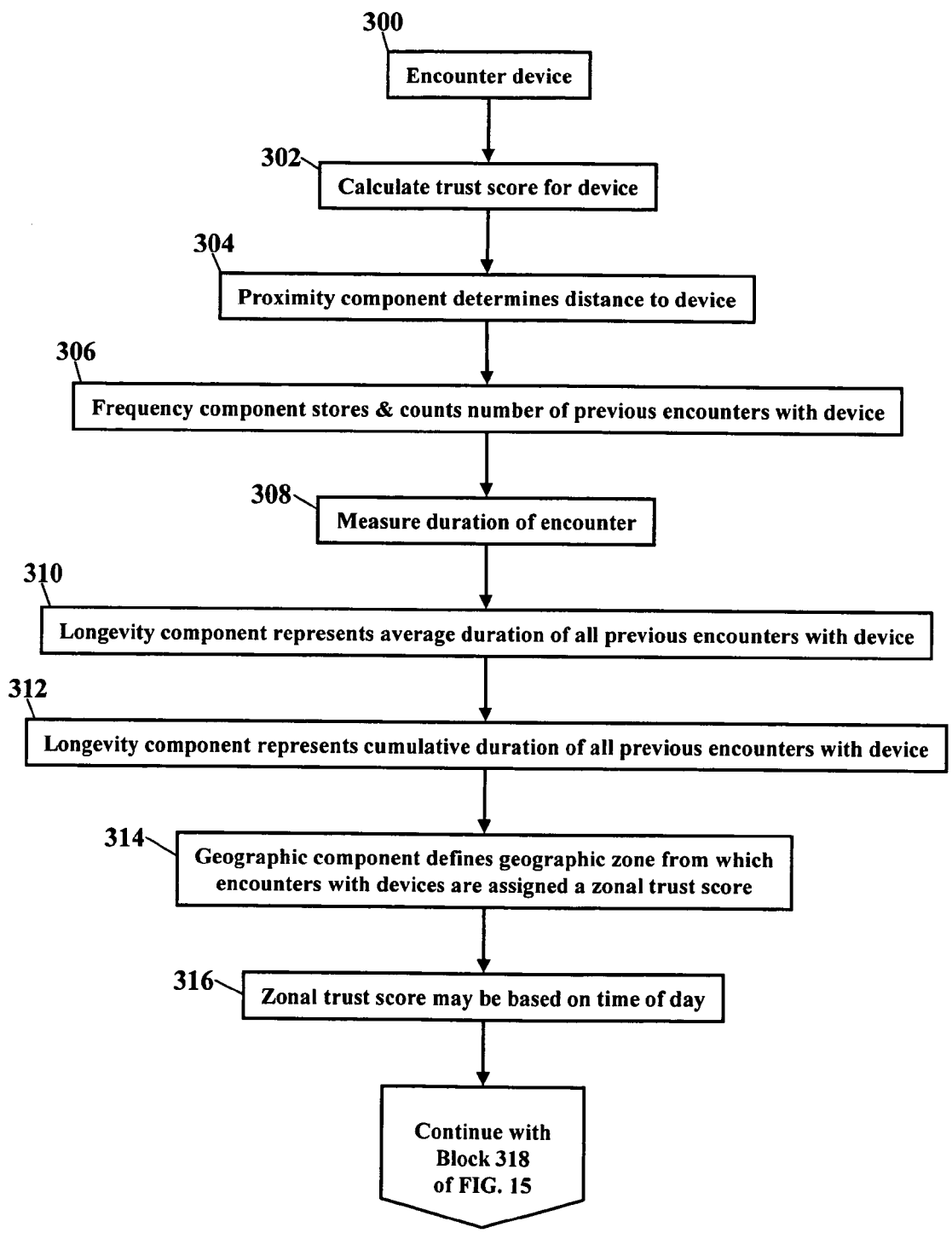
FIGS. 14 and 15 are flowcharts illustrating a processor-implemented method of measuring trust.

FIG. 14 is a flowchart illustrating a processor-implemented method of measuring trust. A device is encountered (Block 300). A trust score for the device is calculated (Block 302). The calculated trust score may have a proximity component that determines a distance to the device (Block 304). The calculated trust score may have a frequency component that stores and counts the number of previous encounters with the device (Block 306). The calculated trust score may measure a duration of the encounter (Block 308). The calculated trust score may have a longevity component that represents an average duration of all previous encounters with the device (Block 310). The calculated trust score may have a longevity component that represents a cumulative duration of all previous encounters with the device (Block 312). The calculated trust score may have a geographic component that defines a geographic zone from which encounters with devices are assigned a zonal trust score (Block 314). The zonal trust score may be based on a time of day (Block 316).

Figure 15:
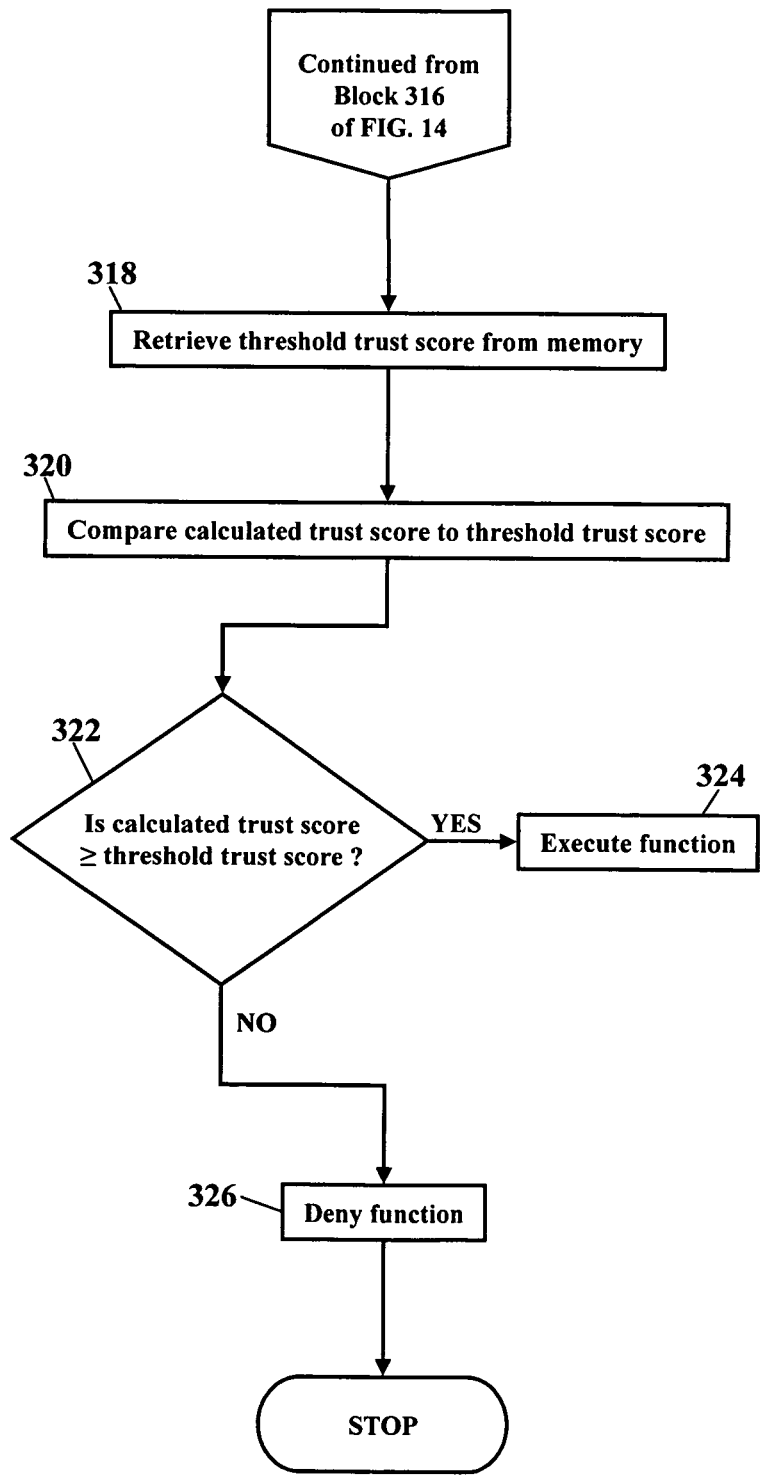

The flowchart continues with FIG. 15. A threshold trust score is retrieved from memory (Block 318), with the threshold trust score representing a minimum trust score associated with the function. The calculated trust score is compared to the threshold trust score (Block 320). If the calculated trust score equals or exceeds the threshold trust score (Block 322), then the function is executed (Block 324). If the calculated trust score is less than the threshold trust score (Block 322), then the function is denied (Block 326).

The trust agent (shown as reference numeral 20 in FIGS. 1-13) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the trust agent to be easily disseminated. A computer program product comprises the trust agent stored on the computer-readable medium. The trust agent comprises computer-readable instructions/code for measuring trust, as hereinabove explained. The trust agent may also be physically embodied on or in any addressable (e.g., HTTP, I.E.E.E. 802.11, Wireless Application Protocol (WAP), or BLUETOOTH®) wireless device capable of presenting an IP address.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A processor-implemented method of measuring trust of a first device from a second device, comprising:

receiving a communication from the first device that requests execution of a function within the second device;

calculating on the second device a trust score for the first device, the trust score calculated at least in part based on a physical distance between the first device and the second device and a measurement of a duration of an encounter between the first device and the second device, wherein the trust score is calculated prior to communicating a response to the first device;

retrieving a threshold trust score from a memory of the second device, the threshold trust score having a minimum trust score associated with the function;

comparing the calculated trust score to the threshold trust score;

if the calculated trust score equals or exceeds the threshold trust score, then executing the function; and if the calculated trust score is less than the threshold trust score, then denying execution of the function.

2. The method according to claim 1, wherein the step of calculating the trust score comprises calculating a frequency component that stores and counts a number of previous encounters between the first device and the second device.

3. The method according to claim 1, wherein the step of calculating the trust score comprises calculating a longevity component that represents an average duration of all previous encounters between the first device and the second device.

4. The method according to claim 1, wherein the step of calculating the trust score comprises calculating a longevity component that represents a cumulative duration of all previous encounters between the first device and the second device.

5. The method according to claim 1, wherein. the step of calculating the trust score comprises calculating a geographic component, the geographic component defining a geographic zone from which encounters with devices are assigned a zonal trust score, the zonal trust score based on a time of day.

6. A system, comprising:
a memory;
a trust agent stored in the memory; and
a processor communicating with the memory,
the system receiving a communication from a first device that requests execution of function within the system;
the processor calculating a trust score for the first device, the trust score calculated at least in part based on a physical distance between the first device and the system and a measurement of a duration of an encounter between the first device and the system as a component of the trust score, wherein the trust score is calculated prior to communicating a response to the first device;
the processor retrieving a threshold trust score from the memory, the threshold trust score having a minimum trust score associated with the function;
the processor comparing the calculated trust score to the threshold trust score;
if the calculated trust score equals or exceeds the threshold trust score, then the trust agent permits execution of the function; and
if the calculated trust score is less than the threshold trust score, then the trust agent denies execution of the function.

7. The system according to claim 6, wherein the processor calculates a frequency component of the trust score that stores and counts a number of previous encounters between the first device and the system.

8. The system according to claim 6, wherein the processor calculates a longevity component of the trust score that represents an average duration of all previous encounters between the first device and a second device.

9. The system according to claim 6, wherein the processor calculates a longevity component of the trust score that represents a cumulative duration of all previous encounters between the first device and a second device.

10. The system according to claim 6, wherein the processor calculates a geographic component of the trust score, the geographic component defining a geographic zone from which encounters with devices are assigned a zonal trust score, the zonal trust score based on a time of day.

11. A computer program product comprising a non-transitory computer-readable medium storing instructions for performing the following steps:
receiving, on a second device, a communication from a first device that requests execution of a function within the second device;
calculating on the second device a trust score for the first device, the trust score calculated at least in part based on a physical distance between the first device and the second device and a measurement of a duration of an encounter between the first device and the second device as a component of the trust score, wherein the trust score is calculated prior to communicating a response to the first device;
retrieving a threshold trust score from a memory of the second device, the threshold trust score having a minimum trust score associated with the function;
comparing the calculated trust score to the threshold trust score;
if the calculated trust score equals or exceeds the threshold trust score, then executing the function; and
if the calculated trust score is less than the threshold trust score, then denying execution of the function.

12. The computer program product according to claim 11, further comprising instructions for calculating a frequency component of the trust score that stores and counts a number of previous encounters between the first device and the second device.

13. The computer program product according to claim 11, further comprising instructions for calculating a longevity component of the trust score, the longevity component representing at least one of i) an average duration of all previous encounters between the first device and the second device ii) a cumulative duration of all previous encounters between the first device and the second device.

14. The computer program product according to claim 11, further comprising the instructions for calculating a geographic component of the trust score, the geographic component defining a geographic zone from which encounters with devices are assigned a zonal trust score, the zonal trust score based on a time of day.

15. A processor-implemented method of measuring trust of a first device from a second device, comprising:
receiving a communication from the first device that requests execution of a function within the second device;
calculating on the second device a trust score for the first device, the trust score calculated at least in part based on a physical distance between the first device and the second device and a calculation of a longevity component that represents an average duration of all previous encounters between the first device and the second device, wherein the trust score is calculated prior to communicating a response to the first device;
retrieving a threshold trust score from a memory of the second device, the threshold trust score having a minimum trust score associated with the function;
comparing the calculated trust score to the threshold trust score;
if the calculated trust score equals or exceeds the threshold trust score, then executing the function; and
if the calculated trust score is less than the threshold trust score, then denying execution of the function.

16. A system, comprising:
a memory;
a trust agent stored in the memory; and
a processor communicating with the memory;
the system receiving a communication from a first device that requests execution of a function within the system;
the processor calculating a trust score for the first device, the trust score calculated at least in part based on a physical distance between the first device and the system and a calculation of a longevity component of the trust score that represents an average duration of all previous encounters between the first device and the system, wherein the trust score is calculated prior to communicating a response to the first device;

the processor retrieving a threshold trust score from the memory, the threshold trust score having a minimum trust score associated with the function;

the processor comparing the calculated trust score to the threshold trust score;

if the calculated trust score equals or exceeds the threshold trust score, then the trust agent permits execution of the execution of the function; and if the calculated trust score is less than the threshold trust score, then the trust agent denies execution of the function.

* * * * *